United States Patent
Judd

(10) Patent No.: US 10,185,022 B1
(45) Date of Patent: Jan. 22, 2019

(54) BORESIGHT METHOD

(71) Applicant: Judd Strategic Technologies, LLC, Rockwall, TX (US)

(72) Inventor: Mano D. Judd, Heath, TX (US)

(73) Assignee: Mano D. Judd, Heath, TX (US)

( * ) Notice: Subject to any disclaimer, the term of this patent is extended or adjusted under 35 U.S.C. 154(b) by 176 days.

(21) Appl. No.: 15/173,025

(22) Filed: Jun. 3, 2016

Related U.S. Application Data

(63) Continuation of application No. 13/896,569, filed on May 17, 2013.

(51) Int. Cl.
 *G01S 7/40* (2006.01)
 *G01S 3/02* (2006.01)
 *G01S 3/48* (2006.01)

(52) U.S. Cl.
 CPC ............... *G01S 3/023* (2013.01); *G01S 3/48* (2013.01)

(58) Field of Classification Search
 None
 See application file for complete search history.

(56) References Cited

U.S. PATENT DOCUMENTS

| | | | | |
|---|---|---|---|---|
| 5,412,414 A * | 5/1995 | Ast | .................... | G01S 7/4017 342/174 |
| 5,530,449 A * | 6/1996 | Wachs | ................... | H01Q 3/267 342/174 |
| 5,969,667 A * | 10/1999 | Farmer | .................... | G01S 7/038 342/165 |
| 6,411,249 B1 * | 6/2002 | Rose | ........................ | G01S 7/021 342/13 |
| 6,535,560 B1 * | 3/2003 | Masenten | .............. | H03D 3/008 329/308 |
| 6,738,020 B1 * | 5/2004 | Lindskog | .............. | H01Q 3/2605 342/175 |
| 7,482,976 B2 * | 1/2009 | Plesinger | ............... | H01Q 3/267 342/368 |
| 8,171,777 B2 * | 5/2012 | Schilffarth | ......... | G01N 15/1012 250/252.1 |
| 8,184,042 B2 * | 5/2012 | Ray | ........................ | H01Q 3/267 342/174 |
| 2003/0174328 A1 * | 9/2003 | Russell | ..................... | G01J 4/00 356/366 |
| 2004/0184562 A1 * | 9/2004 | Wang | ..................... | H03D 3/009 375/322 |
| 2008/0130800 A1 * | 6/2008 | Maxim | .................... | H03C 3/40 375/345 |
| 2009/0071225 A1 * | 3/2009 | Schilffarth | .......... | G01N 15/1012 73/1.02 |
| 2010/0093282 A1 * | 4/2010 | Martikkala | ............ | H04B 17/14 455/63.4 |
| 2012/0245853 A1 * | 9/2012 | Baumann | ........... | A61B 5/02028 702/19 |
| 2014/0171008 A1 * | 6/2014 | Nentwig | ................... | H04B 1/30 455/323 |

* cited by examiner

*Primary Examiner* — Sunit Pandya

(57) ABSTRACT

A method for calibrating signals that uses continuous calibration throughout the signal collection process is described.

20 Claims, 1 Drawing Sheet

BORESIGHT METHOD

CROSS REFERENCE TO RELATED INFORMATION

This application is a continuation of U.S. patent application Ser. No. 13/896,569, filed May 17, 2013, titled Boresight Method, now abandoned.

TECHNICAL FIELD

The present invention is in the technical field of RF receivers and Direction Finding Methodologies and/or RFCalibration and Boresighting. More specifically, the present invention is a novel way of assuring accuracy during RF signal collection by using a continuous calibration signal (also called a reference signal) in the receiver to correct for phase and amplitude errors or perturbations.

BACKGROUND OF THE INVENTION

During the signal collection process used in direction finding (DF), signals are processed by multichannel receivers which take the collected signals and coherently frequency shift them down in frequency to an Intermediate Frequency (IF) or to baseband, so they can be digitized and processed at a lower frequency that is adequate for high bit Analog to Digital Converters (ADCs).

In order to perform the direction finding operation, the cross product of multiple receiver channels is taken to obtain the cross phase between each two antenna components or antenna pairs. For example, in a 3 channel coherent receiver, the cross phase is obtained between channels, 1 and 2, 2 and 3, and 1 and 3. Direction finding accuracy is often compromised when using most multi-channel receivers since the frequency shift operation results in phase and/or amplitude distortions of each signal, that add to perturb the true cross product of the antennas, and therefore perturb the effective cross phase. This distortion is often caused by temperature, time, and vibration instability of the various RF and IF components in the receivers, which in effects adds colored noise into the cross phase outputs.

The conventional solution to the accuracy problem in direction finding is to use a switched calibration (or boresight) method. This process involves injecting a calibration (or boresight) signal into the path between the antennas and the multichannel receiver. However, this method has serious shortcomings. In the switched method, the antennas are momentarily switched out, when the calibration source is switched in, This occurs in all input paths. All calibration inputs are coherent since they originate from a split (power) copy of the calibration signal. This calibration signal is then down-converted in the receiver and sampled, using a coherent sampling (timed) signal, for each independent receiver output.

Finally, this signal is processed to generate a calibration (or boresight) vector, used to compensate the collected far field signals. This switched boresighting process cannot occur at the same time as collecting the far field signals required for DF, since the DF antennas have been switched out. Additionally, this process requires the user to calibrate (boresight) the system many minutes or hours prior to actual DF operation. This is disadvantageous because the resulting boresight vector becomes old or no longer adequately represents the current amount of phase and gain variations or distortions. This method is also handicapped because the signal collection activity required in direction finding must cease and the reference signal must be emitted or "switched in" so the receivers can process the reference signal; therefore, calibration and collection of the desired signal cannot occur at the same time. That is, the wideband (noise) signal must be switched in, dwelled and collected, and then switched back out. There must be a switch back to the desired signal and antennas.

The result of this process is that the amount of time spent boresighting is limited. The switch in method does not permit simultaneous boresight/calibration signal collection and DF operation.

BRIEF SUMMARY OF THE INVENTION

The present invention is a method for boresighting. The present invention is a method of accounting for and correcting for the errors that occur in a receiver during signal collection. Errors occur in a receiver during signal collection due to changes in temperature, a receiver's age, vibration of the system during collection, oscillator lock, and other reasons.

In conventional boresighting (calibration) methods, a wideband noise source is generally used so tuning is not necessary. This source is then split, M ways, and switched input to each receiver (input) channel. This method enables a means to ensure a collected signal can be calibrated at any point during the signal collection period without having to cease signal collection in order to switch in a reference signal.

One of the key elements of this method is that instead of switching between the two input paths: the desired signal or the boresight source, both of these signals are RF coupled together, thus both signals can simultaneously be routed to the receiver on the same RF transmission line(s). The calibration/boresight signal can be (frequency) offset from the desired signal, or it can be code division multiplexed on top of the desired signal; with a follower decoding circuit to remove it after receiver down-conversion, in frequency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

This boresighting method works by inputting a known reference signal that is offset, in frequency, from the signals that are collected and sent to the multi-channel receiver during signal collection in a multi-channel system/array. The offset reference (Foresight) signal is collected simultaneously with sign al collection of the desired signals. Each of the signals within the multichannel system are band pass filtered digitally at the processing stage to extract each of the two independent signals, for each channel.

Alternatively, the lower signal(s) within each channel can be low pass filtered and the higher signal can be high pass filtered. The filter cut-off frequency is within the "no signal" area between the two signals within each channel: the desired signal and the boresight/reference signal. The boresight signal is then used at some later time to correct the desired signal within each channel for phase and amplitude variations caused by time temperature, vibration, and other systemic causes.

Figure 1:
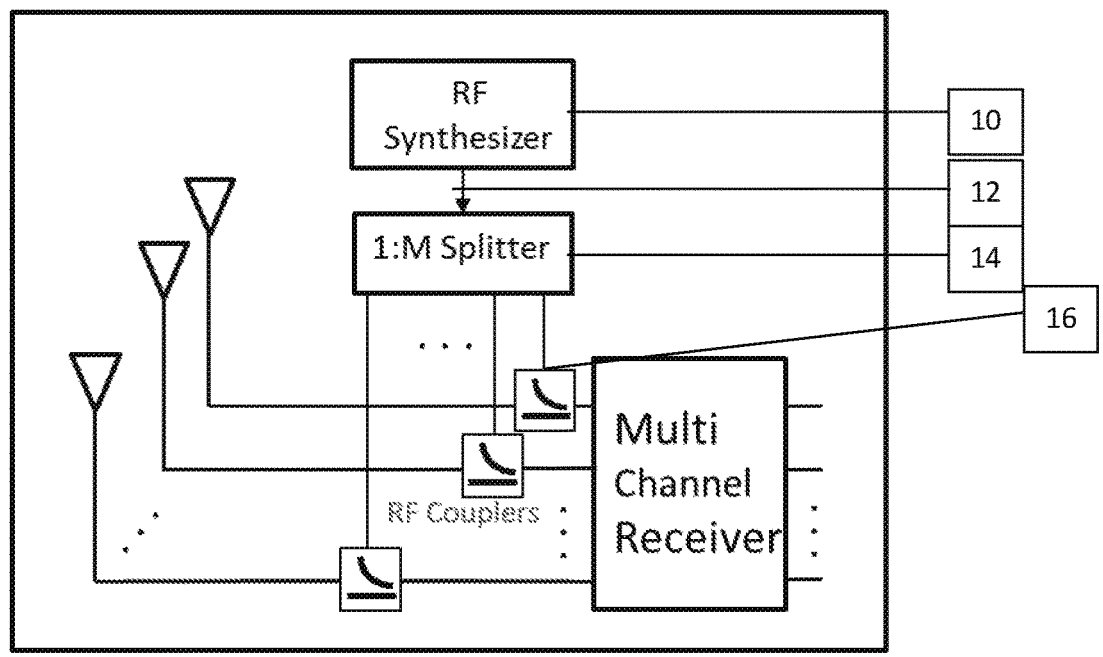
FIG. 1 is a perspective view of a circuit diagram of the present invention.

Referring now to the invention in more detail, in FIG. 1 there is shown a system block diagram depicting an RF synthesizer, 10, which is generating a tuneable tone (at the output 12) or any narrowband signal which is then analog split the via the 1:M RF splitter 14, depicted below the RF synthesizer in FIG. 1. This reference signal can be any narrowband signal; which would be offset in frequency, or a wideband signal that is code division multiplexed signal that would be on top of the desired signal for each channel.

Each of the split outputs are then RF coupled into the antenna RF paths, rather than switched into the multichannel receiver. The split paths go into the RF couplers 16, shown superimposed over the antennas in FIG. 1. As a result, each antenna output signal has a summed boresight signal within it that is offset in frequency from the signal from the antenna's signal.

The function of the multi-channel receiver is to frequency down-convert the signals coherently within each channel, to a lower IF or baseband frequency range, adequate for digital sampling. However, this process incurs unknown amounts of phase error, phase noise, frequency deviation, and amplitude distortion which can also be different from channel to channel. Both signals pass through the multi-channel receiver and receive the same level, amount, and type of distortion on a microsecond to microsecond basis. After bandpass filtering the signals digitally, the boresight signal can be used to phase correct the desired signal within each channel.

The RF Synthesizer can output any type of RF source signal that is sufficiently narrowband to pass through the multi-channel receiver bandwidth, and be offset from the desired signals (frequency).

Figure 2:
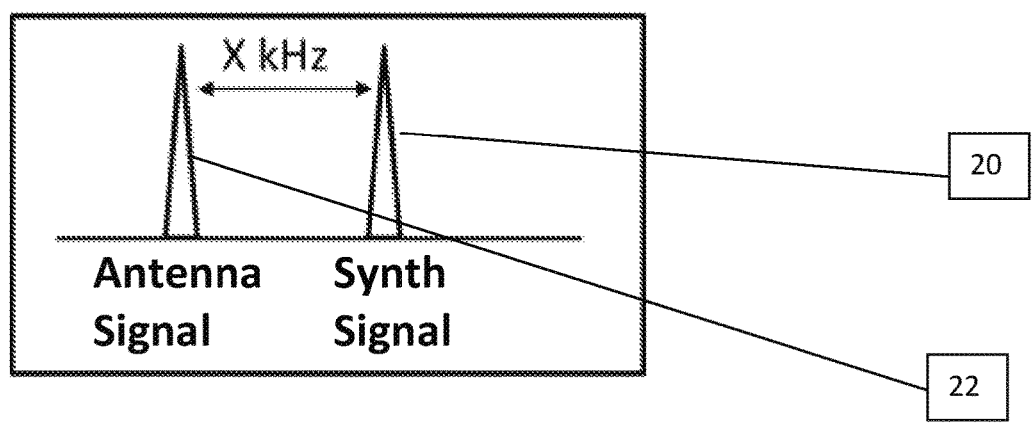
FIG. 2 is a signal view of the frequency domain of the present invention.

Referring now to the invention in more detail, in FIG. 2, there is shown the signals in the frequency domain. The two signals depicted are calibration/reference signal 20 from the antenna and a synthesizer (narrowband) or noise source (wideband) signal 22 which is the signal from the boresight source. The calibration/boresight signal 20 can be a signal of any type and bandwidth. The frequency offset of the synthesizer signal from the calibration/boresight signal is constrained by the following: the synthesizer signal must not overlap in frequency with any part of the calibration signal, and the total end to end spectral distance of the outer edges between the two signals must be less than the receiver instantaneous bandwidth or DDC bandwidth or the multi-channel receiver. Finally, both signals are subsequently band pass filtered with high spectral rejection levels. The synthesizer signal 22 should be as narrowband as possible. This allows the signal to be as spectrally close to the desired signal as possible, to obtain the most similar spectral errors and frequency dependent perturbations.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of signal calibration comprising: receiving, by an antenna, an RF signal;
providing, by an RF synthesizer, a tuneable tone;
coupling, by a coupler, the tuneable tone into the RF signal to create a composite signal;
transmitting, by the coupler, the composite signal to a multi-channel receiver;
down-converting, by the multi-channel receiver, the composite signal;
bandpass filtering, by a processor, the combined signal within each channel; and
phase correcting, by a processor, the RF signal within each channel by using the tuneable tone, which enables simultaneous RF signal collection and boresighting within each channel.

2. The method of signal calibration of claim 1 wherein the tuneable tone and the RF signal comprise non-overlapping frequencies.

3. The method of signal calibration of claim 1 wherein the end to end spectral distance of the outer edges between the tuneable tone and the RF signal is less than the multi-channel receiver instantaneous bandwidth or DDC bandwidth of the multi-channel receiver.

4. The method of signal calibration of claim 1 wherein the tuneable tone is frequency offset from the RF signal within each channel.

5. The method of signal calibration of claim 1 the tuneable tone is code division multiplexed.

6. The method of signal calibration of claim 1 wherein one of the tuneable tone and the RF signal is low pass filtered and the other is high pass filtered within each channel.

7. The method of signal calibration of claim 1 further comprising digitally sampling the combined signal for each channel.

8. A method of signal calibration comprising:
receiving, at a plurality of antennas, a plurality of RF Signals;
producing, by an RF synthesizer, a tuneable tone;
splitting, by a splitter, the tuneable tone into a plurality of tone signals;
coupling, by a plurality of couplers, the plurality of one signals into the plurality of RF signals to create a plurality of combined signals;
receiving, by a multi-channel receiver, the plurality of combined signals; and
phase correcting, by a processor, the plurality of RF signals using the plurality of tone signals, which enables simultaneous RF signal collection and boresighting within each channel.

9. The method of claim 8 wherein the plurality of tone signals and the plurality of RF signals comprise non-overlapping frequencies.

10. The method of claim 8 wherein the end to end spectral distance of the outer edges between the plurality of tone signals and the plurality of RF signals is less than the multi-channel receiver instantaneous bandwidth or DDC bandwidth of the multi-channel receiver.

11. The method of claim 8 wherein the plurality of tone signals are frequency offset from the plurality of RF signals within each channel.

12. The method of claim 8 wherein the plurality of tone signals are code division multiplexed.

13. The method of claim 8 further comprising low pass filtering one of the plurality of tone signals or the plurality of RF signals and high pass filtering the other.

14. A system for signal calibration comprising:
a plurality of antennas operable to receive a plurality of RF signals;
an RF synthesizer operable to create a tuneable tone;
a splitter operable to split the tuneable tone into a plurality of tone signals;
a plurality of RF couplers operable to couple the plurality of tone signals with the plurality of RF signals to create a plurality of combined signals;
a multichannel receiver operable to receive the plurality of combined signals;
a microprocessor operable to analyze the plurality of combined signals and provide phase correction of the plurality of RF signals using the plurality of tone signals; and
simultaneous collection and boresight for each channel.

15. The system of claim 14 wherein the plurality of tone signals and the plurality of RF signals comprise non-overlapping frequencies.

16. The system of claim 14 wherein the end to end spectral distance of the outer edges between the plurality of tone signals and the plurality of RF signals is less than the multi-channel receiver instantaneous bandwidth or DDC bandwidth of the multichannel receiver.

17. The system of claim 14 wherein the plurality of tone signals are frequency offset from the plurality of RE signals within each channel.

18. The system of claim 14 wherein the tuneable tone is code division multiplexed.

19. The system of claim 14 wherein the microprocessor is operable to provide low pass filtering of one of the plurality of tone signals or plurality of RF signals and high pass filtering of the other of the plurality of tone signals or plurality of RF signals within each channel.

20. The system of claim 14 wherein the microprocessor is operable to provide digital sampling of the plurality of combined signals.

* * * * *